United States Patent [19]

Mohs

[11] 4,154,504
[45] May 15, 1979

[54] SAFETY REFLECTIVE SEAL TRIM STRIP

[76] Inventor: Bruce B. Mohs, 2355 University Ave., Madison, Wis. 53705

[21] Appl. No.: 880,090

[22] Filed: Feb. 22, 1978

[51] Int. Cl.² .......................... B60Q 1/32; G02B 5/12
[52] U.S. Cl. .................................. 350/97; 40/578; 40/591; 52/716; 293/1; 105/424
[58] Field of Search ................. 350/97, 103, 105, 109; 40/208, 1.5, 582, 591, 578; 24/73 HS; 277/89; 16/2; 52/716; 293/1, 71 R; 105/424

[56] References Cited

U.S. PATENT DOCUMENTS

| | | | |
|---|---|---|---|
| 2,226,597 | 12/1940 | Thomas | 350/97 X |
| 2,354,018 | 7/1944 | Heltzer et al. | 40/582 X |
| 2,602,402 | 7/1952 | Sanford, Jr. et al. | 105/424 X |
| 2,652,651 | 9/1953 | La Barbera | 350/107 X |
| 2,918,570 | 12/1959 | Diedring | 350/97 |
| 2,941,447 | 6/1960 | Abbott, Sr. | 350/97 X |
| 3,017,713 | 1/1962 | Bulter | 40/582 X |
| 3,215,039 | 11/1965 | Gill, Jr. | 350/109 X |
| 3,274,041 | 9/1966 | Gill, Jr. | 350/106 X |
| 3,291,516 | 12/1966 | Kavos | 293/DIG. 4 |
| 3,387,397 | 6/1968 | Buchanan et al. | 40/618 |
| 3,587,184 | 6/1971 | Walker, Jr. | 40/478 X |
| 3,687,794 | 8/1972 | Shanok et al. | 350/97 |
| 3,797,912 | 3/1974 | Humlong | 350/97 X |
| 3,841,682 | 10/1974 | Church et al. | 52/716 X |

*Primary Examiner*—Daniel M. Yasich
*Attorney, Agent, or Firm*—Theodore J. Long; Harry C. Engstrom; Nicholas J. Seay

[57] ABSTRACT

A safety reflective trim strip includes a holding frame of any selected length having a holding channel therein into which one or more reflector lenses are inserted. The holding frame is cut to any desired length and includes special features for aid in its attachment to an object. End caps are provided to close the ends of the holding channel after the reflector lenses are inserted. The reflector lenses are either slid into the holding frame through one open end thereof or are snapped into the holding frame from the front.

11 Claims, 5 Drawing Figures

SAFETY REFLECTIVE SEAL TRIM STRIP

BACKGROUND OF THE INVENTION

1. Field of the Invention

This invention relates to light reflectors and more particularly to reflective strips adapted to be attached to a solid object in order to render that objects more visible under low light conditions.

2. Description of the Prior Art

Reflectors are commonly used to mark vehicles such as buses, trailers, and trucks, as well as such stationary objects as mailboxes, fences, and signs. The reflectors are designed to render the objects more noticable under low light conditions by reflecting back to a viewer a significant portion of the light falling upon the reflector. One of the most successful ways of accomplishing this reflection with the minimum of light loss is to employ a transparent reflector lends having an internal structure adapted to redirect and reflect light by means of internal reflection. When a comparatively small reflector is sufficient to adequately mark an object, such a lens molded from transparent plastic or glass often can be used successfully.

Plastic and glass reflectors generally are rigid and relatively fragile, and it is often desirable to contain them within some sort of protective frame. Such frames, however, are cumbersome and inconvenient where a long reflective strip is desired. A glass or plastic reflector several feet long, for example, is undesirably vulnerable to breakage during shipment or application. Such a reflector twenty feet long proves entirely unmanagable. Consequently, reflective tape is commonly employed to produce long reflective strips. The tape is difficult to attach firmly to rough objects, however, and is more vulnerable to weather and minor abrasion than is a glass or plastic reflector within a protective frame. Often when one section of a long piece of reflective tape has become loosened, the entire strip is pulled off as the loose end whips in the wind. Furthermore, special washing or other surface preparation is often necessary before tape can be applied to an object such as a truck, the outer surface of which is often coated with oil and dirt from use on the road.

SUMMARY OF THE INVENTION

I have invented a reflective safety strip for use on motor vehicles, signs, or any object on which it is desired to place a long and narrow reflector. My reflective safety strip has an elongated holding frame which may be manufactured from a flexible plastic or other material by an extrusion process. The holding frame is preferably supplied in long continuous sections which can be rolled for convenient shipping and storage. The holding frame has formed in it a holding channel, the channel running the length of the holding frame. Conventional plastic reflector lenses made in lengths suitable for easy handling and storage are adapted to slide into an open end of the holding channel after the holding frame has been cut to the desired length and fastened in place. Alternatively the reflector lenses may be snapped into the holding frame from the front. The plastic reflector lenses are retained in the holding channel by retaining flanges on the holding frame. End caps are used to prevent the reflector lenses from slipping out of the ends of the holding channel.

When it is desired to apply a reflective strip to a truck, for example, a roll of holding frame at least as long as the reflective strip contemplated is unrolled and secured to the side of the truck with rivets or screws. Once the holding frame is fastened in place and cut to the desired length, reflector lenses are then inserted into the holding channel from either open end of the holding frame, or are snapeed in the front thereof, until enough of the lenses have been inserted to fill the holding frame completely. An end cap is then removably fastened at each end of the holding frame to block the open ends of the holding channel, thereby keeping the lenses from slipping out the ends of the holding channel.

The reflective strip thus assembled and applied is securely attached to the object it marks, has not required that the surface of the object be specially prepared, and will not loosen with weather, washing, or minor abrasion. Furthermore, should any one reflector lens in the frame be broken, it can be replaced by first removing the broken pieces and then inserting a replacement lens at one end of the holding frame, shifting the lenses until the gap left by the broken lens has been filled. Reflector lenses may be made in a variety of colors so that decorative patterns or colors may be displayed on signs or in other applications. Numbers or letters constructed from lengths of my reflective strip may be applied to the sides of trucks or to other surfaces to be easily observed under low light conditions. The triangular symbol for a slow moving vehicle may be applied to the back of such a vehicle using sections of my reflective strip. An attention attracting, very large triangle may easily be made and proportioned to fit the particular vehicle.

Other features and advantages of my invention will be apparent from the following detailed description taken in conjunction with the accompanying drawings showing preferred embodiments of a safety reflective trim strip exemplifying the principles of my invention.

DETAILED DESCRIPTION OF THE PREFERRED EMBODIMENT

Figure 2:
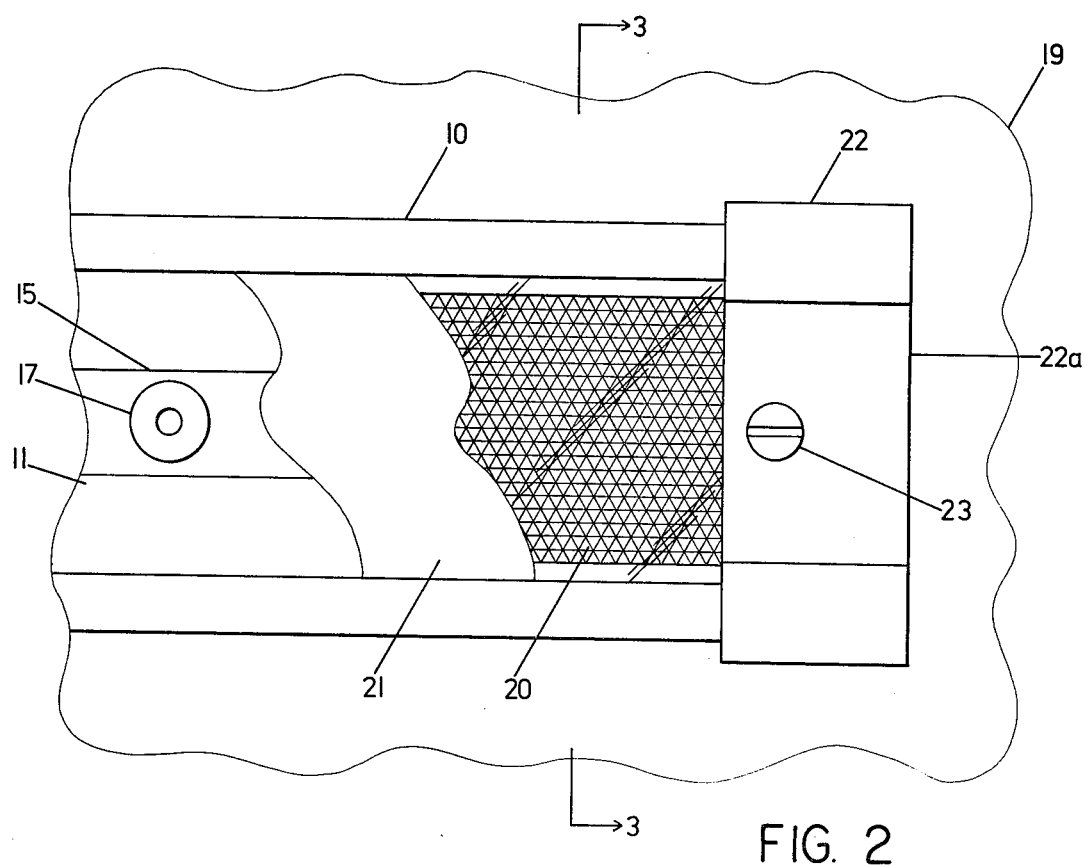
FIG. 2 is a front elevation view of one end of my safety reflective trim strip attached to a broken away section of an object to be marked and with parts of the trim strip being also broken away.
Figure 3:
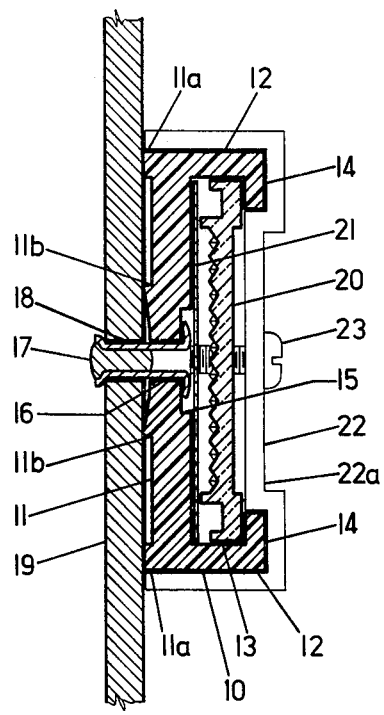
FIG. 3 is a cross-sectional view taken along lines 3—3 of FIG. 2.

As shown in FIGS. 2 and 3, my safety reflective trim strip includes an elongated holding frame 10 formed to any length as may be desired for the particular application. In my preferred embodiment, the holding frame is formed of an extruded polyvinyl thermoplastic material, although other plastics or flexible metals such as aluminum, could also be used. The holding frame 10 includes a back 11 and two opposed substantially parallel side walls 12 projecting outwardly from the back 11 and extending for substantially the length of the holding frame. Each of the side walls 12 has formed toward its outward edge a retaining flange 14 projecting toward the other side wall 12, with the back 11, the side walls 12, and the retaining flanges 14 combining to define a holding channel 13 therebetween with the length of the side walls 12 being selected so that the holding channel 13 is deep enough to securely receive a selected reflector lens therein. The retaining flanges 14 function to retain the reflector lens in the holding channel 13.

The front surface of the holding frame back 11 has a rectangular fastener or rivet channel 15 formed extending longitudinally therein parallel to the side walls 12 for substantially the entire length of the holding frame 10. The back 11 also has at least one and preferably several fastener or rivet holes 16 extending therethrough and located centrally within the rivet channel 15. A rivet 17 is inserted through each of the rivet holes 16 and through corresponding holes 18 drilled at appropriate locations in the object to be marked 19, thereby securely and rigidly fastening the holding strip to the object. The rivet channel 15 is deep enough so that the head of the rivet 17 is completely contained therein and does not protrude beyond the front surface of the back 11 into the holding channel 13. It is intended that screws, adhesive, tape or other means for attaching the holding strip to the object to be marked could be used without departing from the spirit and scope of my invention.

Two ridges 11a project backwardly from the side edges of the back 11 and extend for substantially the length of the holding frame 10. The ridges 11a project from the back sufficiently far to prevent the holding frame from rocking when it is fastened to a contoured or curved surface. Two sealing welts 11b which taper to ridged apexes also project from the backwardly facing surface of the back and extend for substantially the length of the holding frame. The sealing welts 11b are so located that the rivet 17 passes between them. When the holding frame is riveted to an object to be marked, the portion of the back 11 between the sealing welts 11b is stressed and the sealing welts 11b are drawn tightly against the surface, thereby securing the trim strip against movement and rattling and preventing water from flowing around the rivet 17 to enter the object to be marked through the rivet hole.

Figure 4:
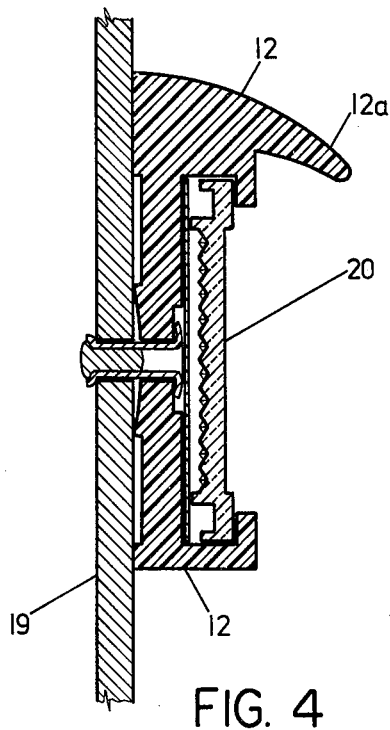
FIG. 4 is a cross-section view similar to FIG. 3 but showing an alternative embodiment of my safety trim strip.

If desired, the upper most of the two sides 12 may be adapted to project beyond the associated retaining flange 14 to form a drip cap 12a, shown in FIG. 4. The drip cap 12a extends for substantially the length of the holding frame and projects outward sufficiently far to divert water flowing down the side of the marked object from passing over the reflector lens.

At least one reflector lens 20 is slidably received in the holding channel 13 and is retained in place by the retaining flanges 14. The reflector lens 20 is selected to be of a length convenient for shipping, handling, and storage. The reflector lens 20 may be made of acrylic plastic or other conventional reflector material and has an internal structure designed to reflect a substantial amount of the light incident thereon back toward any person viewing the safety reflector trim strip.

In my preferred embodiment, a reflective under strip 21 made of a metallic or other highly reflective tape having a specular surface is applied to the bottom of the holding channel 13 before the reflector lens 20 is inserted. The reflective under strip 21 enhances the reflectivity of the relfector lens 20 increasing that percentage of the light incident on the reflective safety trim strip which is returned to a viewer of the strip.

End caps 22 are adapted to block the ends of the holding channel 13 to secure the reflector lens 20 therein when the end caps are placed over the ends of the holding frame 10. The outwardly facing surface of the end caps 22 have an inset portion 22a adapted to fill the space between the opposed retaining flanges 14. When each end cap 22 is in place, its inset portion 22a engages the inwardly facing surface of the retaining flange 14, preventing the end cap 22 from being twisted or rotated relative to the holding strip. Each end cap 22 has at least one screw hole (not shown) extending therethrough. At least one self-tapping screw 23 is adapted to extend through the screw hole and threadedly engage a hole drilled at a desired location in the object to be marked, thereby removably but rigidly fastening the end cap 22 in place.

When it is desired to install a reflective trim strip, a roll of holding frame 10 is unrolled, cut to the desired length, and riveted in place. A reflective under strip 21 is then applied, if desired. Next, as many reflector lenses 20 as are needed to fill the holding frame are inserted into either end of the holding channel. No cutting of the reflector lenses 20 is necessary if the holding frame 10 is cut to a length that is a multiple of the length of the individual reflector lenses 20 used. Reflector lenses 20 can be of any color, or lenses of differing colors can be intermixed to achieve desired decorative effects. Finally, one end cap 22 is fastened in place at each end of the holding frame 10, blocking the ends of the holding channel 13 and thereby preventing any of the reflector lenses 20 from sliding out.

Figure 5:
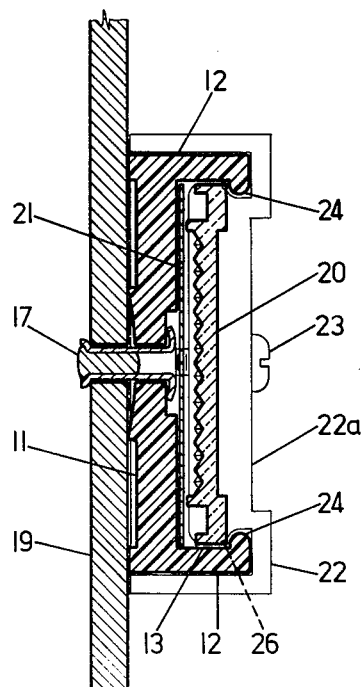
FIG. 5 is a cross-sectional view similar to FIG. 3 but showing another alternative embodiment of my safety trim strip.

Shown in FIG. 5 is an alternative embodiment of my invention. In the holding frame 12 of FIG. 5, the retaining flanges 14 of the embodiment of FIG. 3 are altered to form snap-fit retaining flanges 24 which are relatively short and have rounded ends. With the holding frame 12 formed with the snap-fit retaining flanges 24, the reflector lens 20 can be snapped directly into the front of the holding frame 12 by first inserting the lower edge of the reflector lens 20 behind the lower snap-fit retaining flange 24 and then pressing on the reflector lens 20 to snap its other edge past the upper snap-fit retaining flange 24. Of course, even with this provision for the snap-fit retaining flanges 24, the reflector lens 20 can still be slid into an open end of the holding channel 13 if so desired. Also, with this embodiment the end cap 22 is altered to include snap tabs 26 extending outward from the inset portion 22a of the end cap 22 with the inset portion 22 also being made deeper to extend into the holding channel 13. In this way the end cap 22 can also be snap-fit onto the holding frame 11 by snapping the snap tabs 26 past the snap-fit retaining flanges 24.

Figure 1:
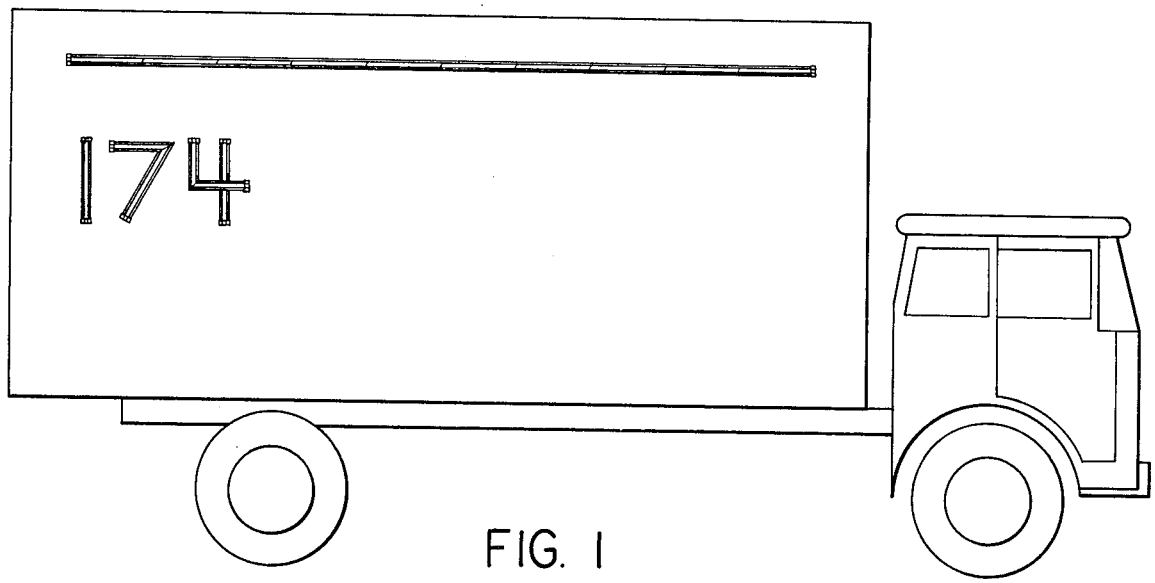
FIG. 1 is a side elevation view of a truck marked with a long strip of my safety reflective trim strip and having an identification number also made from my safety reflective trim strip.

The reflective trim strip thus produced presents what appears to be a continuous plastic reflector in a protective frame, as shown in FIG. 1 installed on a truck. In fact the reflector is composed of individual seqments that can be easily replaced, should one be damaged, without the need to change the entire reflective strip. By means of my invention, strips may be made much longer than those practical with single piece reflectors, and customer trimming and even lettering, as shown in FIG. 1, can be accomplished with ease.

It is understood that my invention is not confined to the particular materials, construction, and arrangement of parts herein illustrated and described. Instead, various changes may be made without departing from the spirit and scope of my invention. My invention embraces all such modified forms thereof as come within the scope of the following claims.

I claim:

1. A safety reflective trim strip for providing an object with a light reflecting strip of any selected length comprising:
   (a) a flexible elongated holding frame having a back, two opposed side walls extending outwardly from the back, and a retaining flange on each side wall projecting toward the opposite side wall, with the back, the side walls and the retaining flanges defining a holding channel therebetween;
   (b) at least one elongated reflector lens composed of essentially transparent plastic and adapted to reflect a substantial amount of light incident thereon toward a viewer, the reflector lens being received within the holding channel;
   (c) a reflective under strip extending for substantially the length of the holding channel and wide enough to substantially cover the bottom of the holding channel, the reflective under strip having a specular surface;
   (d) a pair of end caps secured to the ends of the holding frame to close the ends of the holding channel; and
   (e) a pair of sealing welts extending rearwardly and spaced inwardly from the side edges of the back of the holding frame so as to be pressed against the object, the sealing welts forming a moisture seal against the object.

2. The safety reflective trim strip as claimed in claim 1 wherein the means for securing end caps include inset portions to abut the retaining flanges at the ends of the holding frame to prevent twisting of the end caps relative to the holding frame.

3. The safety reflective trim strip as claimed in claim 1 wherein the holding frame is made of sufficiently flexible material to allow the holding frame to be conveniently stored or shipped in the form of a roll.

4. The safety reflective trim strip as claimed in claim 1 wherein the reflector lens is inserted into the holding channel in the holding frame by sliding the reflector lens into the open end of the holding channel before the end cap is attached.

5. The safety reflective trim strip as claimed in claim 1 wherein the retaining flanges are short and have rounded ends so that the reflector lens can be snap-fit through the front of the holding frame.

6. The safety reflective trim strip as claimed in claim 1 wherein the sealing welts each taper to a ridged apex so as to seal against the object.

7. A safety trim strip for providing an object with a light reflecting strip of any selected length comprising:
   (a) a continuous elongated holding frame of a flexible material including a back, two opposed side walls extending outwardly from the back and a retaining flange formed on each side wall projecting toward the other side wall;
   (b) the back, the side walls and the retaining flanges of the holding frame defining a holding channel therebetween;
   (c) the holding frame having a fastener channel of a generally rectangular cross-section formed in the front surface of the back thereof;
   (d) at least one elongated reflector lens composed of essentially transparent material having an internal structure designed to reflect a substantial part of the light incident thereon back toward a viewer, the reflector lens being slidably received in the holding channel in the holding frame;
   (e) a reflective under strip of a material having a specular surface applied to the front surface of the back of the holding frame underneath the reflector lens and over the fastener channel to enhance the reflectivity of the reflector lens;
   (f) an end cap provided at each end of the holding frame to close the ends of the holding channel, each end cap including an inset portion to abut the retaining fanges to prevent twisting of the end cap relative to the holding frame;
   (g) a pair of ridges extending rearwardly from the rear surface of the back of the holding frame at the edges thereof to allow the holding frame to be securely attached to curved objects;
   (h) the holding frame having at least one fastener hole extending therethrough and opening into the fastener channel; and
   (i) a pair of sealing welts formed on the rear surface of the back of the holding frame on either side of the fastener hole whereby a fastener inserted through the fastener hole to attach the holding frame to the object will stress the portion of the holding frame between the sealing welts to press the sealing welts tightly against the object to form a moisture seal, the head of a fastener so inserted being received in the fastener channel to allow the reflector lens to slide freely in the holding channel.

8. An elongated flexible holding frame supplied in roll form for use in constructing a safety trim strip for attachment to an object to hold a light reflective strip, the holding frame comprising:
   (a) a back having two edges;
   (b) a pair of opposed side walls extending outwardly in parallel from each of the edges of the back;
   (c) a retaining flange formed extending from each of the side walls toward the other side wall;
   (d) the back, the side walls and the retaining flanges defining a safety trim strip holding channel therebetween;
   (e) a pair of ridges extending rearwardly from the edges of the rear surface of the back for the length of the holding frame to allow the holding frame to be securely attached to curved objects; and
   (f) a pair of sealing welts formed on the rear surface of the back, spaced inwardly from the ridges, and extending the length of the holding frame, the sealing welts being tapered to a ridged apex so as to be pressed against the object to form a moisture seal against the object 9. A holding frame as claimed in claim 8 wherein the holding frame is formed of a polyvinyl thermoplastic material.

10. A holding frame as claimed in claim 8 wherein a fastener channel extends the length of the holding frame.

11. A holding frame as claimed in claim 10 wherein at least one fastener hole extends through the back and opens into the fastener channel.

* * * * *